United States Patent
Son et al.

(10) Patent No.: US 11,845,437 B2
(45) Date of Patent: Dec. 19, 2023

(54) VEHICLE AND ACCELERATION LIMIT CONTROL METHOD THEREFOR

(71) Applicants: Hyundai Motor Company, Seoul (KR); Kia Corporation, Seoul (KR)

(72) Inventors: Hui Un Son, Suwon-si (KR); Sang Joon Kim, Seoul (KR); Hong Chul Shin, Gwangmyeong-si (KR); Jae Myoung Pi, Suwon-si (KR); Song Il Park, Seongnam-si (KR); Sang Kyu Park, Suwon-si (KR); Soo Bang Lee, Suwon-si (KR); Seong Ik Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 104 days.

(21) Appl. No.: 17/463,823

(22) Filed: Sep. 1, 2021

(65) Prior Publication Data
US 2022/0089160 A1 Mar. 24, 2022

(30) Foreign Application Priority Data
Sep. 23, 2020 (KR) .......................... 10-2020-0122897

(51) Int. Cl.
*B60W 30/188* (2012.01)
*B60W 30/18* (2012.01)

(52) U.S. Cl.
CPC .... *B60W 30/188* (2013.01); *B60W 30/18181* (2013.01); *B60W 2520/12* (2013.01); *B60W 2540/01* (2020.02); *B60W 2540/041* (2020.02); *B60W 2552/15* (2020.02); *B60W 2720/106* (2013.01)

(58) Field of Classification Search
CPC ......... B60W 30/188; B60W 30/18181; B60W 2540/01; B60W 2540/041; B60W 2552/15; B60W 2520/12; B60W 2720/106
See application file for complete search history.

(56) References Cited

U.S. PATENT DOCUMENTS

2012/0316746 A1  12/2012  Park
2013/0096766 A1   4/2013  Park
(Continued)

FOREIGN PATENT DOCUMENTS

EP  1298020    *  4/2003  ............ B60W 40/13
EP  3378721 A1    9/2018
(Continued)

OTHER PUBLICATIONS

European Patent Office, Extended European Search Report issued in Application No. 21194494.7, dated Feb. 18, 2022, 9 total pages.

*Primary Examiner* — Vivek D Koppikar
*Assistant Examiner* — Joan T Goodbody
(74) *Attorney, Agent, or Firm* — Slater Matsil, LLP

(57) ABSTRACT

An embodiment acceleration limit control method includes determining an acceleration limit based on information on a passenger, determining a disturbance torque due to a disturbance, other than a drive source of a vehicle, based on at least a slope, determining a torque limit satisfying the acceleration limit based on the disturbance torque, and determining an output torque to be generated by the drive source based on the torque limit and a driver's requested torque.

20 Claims, 11 Drawing Sheets

(56) References Cited

U.S. PATENT DOCUMENTS

| | | |
|---|---|---|
| 2015/0361915 A1 | 12/2015 | Sujan et al. |
| 2017/0349178 A1* | 12/2017 | Suzuki |
| 2018/0222468 A1* | 8/2018 | Yamazaki ............. B60W 10/08 |
| 2019/0185019 A1* | 6/2019 | Cho ................... B60W 60/001 |

FOREIGN PATENT DOCUMENTS

| | | |
|---|---|---|
| EP | 3888990 A1 | 10/2021 |
| KR | 101103528 B1 | 1/2012 |
| KR | 101245101 B1 | 3/2013 |
| KR | 101360039 B1 | 2/2014 |
| KR | 101415208 B1 | 8/2014 |
| KR | 101469670 B1 | 12/2014 |
| KR | 20150061781 A | 6/2015 |
| KR | 101693847 B1 | 1/2017 |
| KR | 101694016 B1 | 1/2017 |
| KR | 101837393 B1 | 3/2018 |
| KR | 101907332 B1 | 10/2018 |
| KR | 20190070552 A | 6/2019 |
| KR | 102002421 B1 | 7/2019 |

\* cited by examiner

VEHICLE AND ACCELERATION LIMIT CONTROL METHOD THEREFOR

CROSS-REFERENCE TO RELATED APPLICATIONS

This application claims the benefit of Korean Patent Application No. 10-2020-0122897, filed on Sep. 23, 2020, which application is hereby incorporated herein by reference.

TECHNICAL FIELD

The present disclosure relates to a vehicle and an acceleration limit control method therefor.

BACKGROUND

A speed limit control system is a driving safety system for limiting acceleration so that the driving speed does not exceed the speed limit set by the driver in order to prevent speeding. A representative example of a speed limit control system is a manual speed limit assist (MSLA) system.

In general, because the MSLA system does not perform braking control for deceleration, a vehicle may accelerate above the set speed on a downhill road. Unlike a smart cruise control (SCC) system, the MSLA system does not take into account the relative position or the speed of a preceding vehicle, so the driver needs to keep an eye on the situation ahead.

Recently, a camera-based SLA (CSLA) system, which uses speed limit information recognized by a front camera, and an intelligent SLA (ISLA) system, which further uses speed limit information acquired by a navigation system, have been developed and used.

These speed limit control systems are defined in "SAFETY ASSIST-SPEED ASSIST SYSTEM-SPEED CONTROL FUNCTION", among the evaluation items of The European New Car Assessment Programme (EURO NCAP).

When the speed limit control function is executed, acceleration needs to be taken into account. For example, the ACSF regulations require that lateral acceleration be controlled to be 3 m/s$^2$ or less during autonomous driving or cruise control driving. This acceleration limit is very important, particularly when the vehicle is equipped with a car seat.

When a passenger is younger than 1 year old, it is recommended to keep the passenger in a rear-facing car seat. However, the rear-facing car seat is more problematic when the vehicle accelerates than when the vehicle brakes. Therefore, some models of vehicles are equipped with a function of applying scaling so as to reduce an input value of the accelerator pedal in consideration of the direction that a car seat faces, thereby minimizing jerking of the passenger's body due to acceleration.

However, when the vehicle travels on a sloped road, the scaling control may be problematic. For example, when a vehicle in which a rear-facing car seat is installed is traveling on an uphill road, the body of a passenger in the rear-facing car seat is in the state of leaning in the forward direction of the passenger due to the slope, regardless of the driving state of the vehicle. In this state, if scaling control is performed, it may be possible to minimize additional leaning of the passenger's body due to acceleration, but the vehicle may not be capable of climbing the uphill road, and may roll back. Further, when the vehicle rolls back, the driver may depress the accelerator pedal more deeply, and thus the scaling effect may be degraded.

SUMMARY

The present disclosure relates to a vehicle and an acceleration limit control method therefor. Particular embodiments relate to a vehicle capable of controlling acceleration in consideration of a passenger and an acceleration limit control method therefor.

Accordingly, embodiments of the present invention provide a vehicle and an acceleration limit control method therefor that substantially obviate one or more problems due to limitations and disadvantages of the related art.

Embodiments of the present invention provide a vehicle capable of providing a further improved acceleration limit control function and an acceleration limit control method therefor.

Particularly, embodiments of the present invention provide a vehicle capable of implementing acceleration limit control in consideration of information on a passenger and a slope and an acceleration limit control method therefor.

However, the objects to be accomplished by the embodiments are not limited to the above-mentioned objects, and other objects not mentioned herein will be clearly understood by those skilled in the art from the following description.

In order to accomplish the above and other objects, an acceleration limit control method according to an embodiment of the present invention may include determining an acceleration limit based on information on a passenger, determining disturbance torque due to a disturbance, other than a drive source of a vehicle, based on at least a slope, determining a torque limit satisfying the acceleration limit based on the disturbance torque, and determining output torque generated by the drive source based on the torque limit and the driver's requested torque.

In addition, a vehicle according to an embodiment of the present invention may include a torque calculation controller, configured to determine an acceleration limit based on information on a passenger, to determine disturbance torque due to a disturbance, other than a drive source of a vehicle, based on at least a slope, to determine a torque limit satisfying the acceleration limit based on the disturbance torque, and to determine output torque generated by the drive source based on the torque limit and the driver's requested torque, and a drive source controller, configured to control the drive source based on the output torque.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention. In the drawings.

DETAILED DESCRIPTION OF ILLUSTRATIVE EMBODIMENTS

Figure 1:
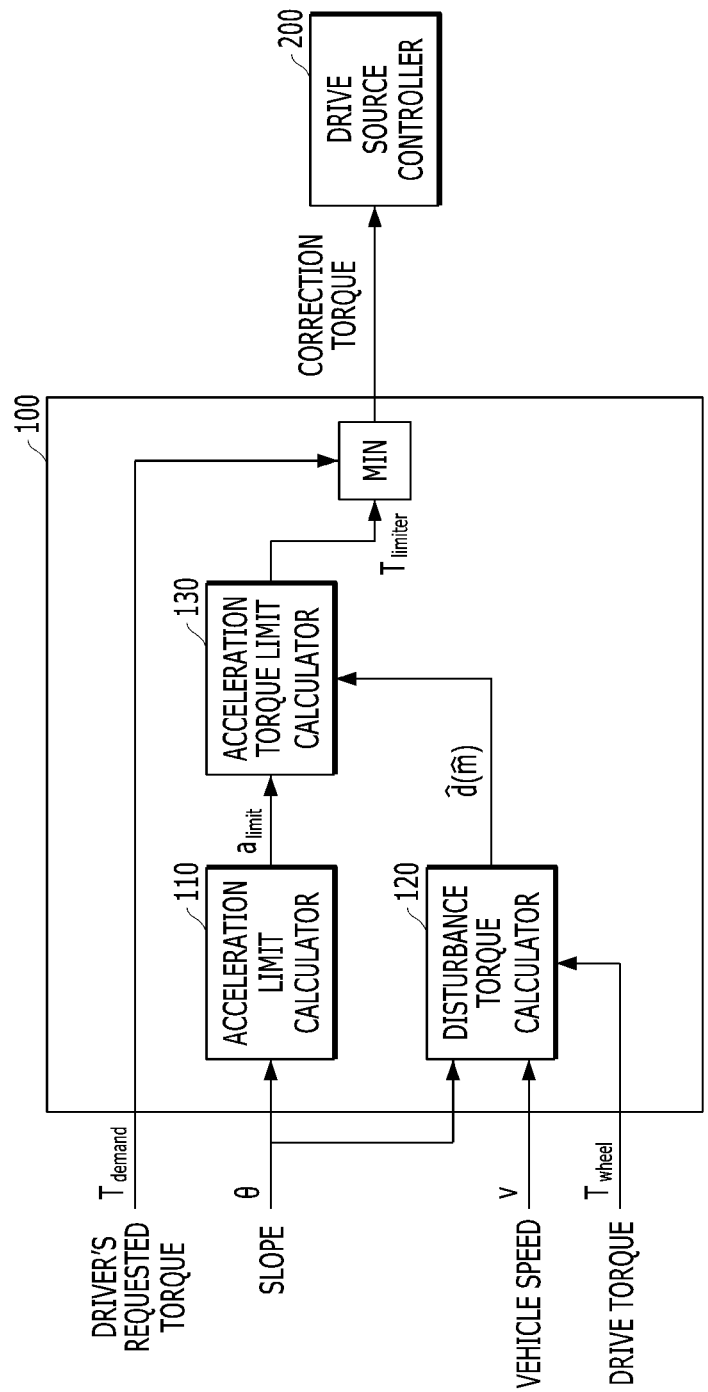
FIG. 1 shows an example of the configuration of a torque calculation controller according to an embodiment of the present invention.

Hereinafter, embodiments of the present invention will be described in detail with reference to the accompanying drawings so that those skilled in the art may easily carry out the embodiments. The present invention may, however, be embodied in many different forms, and should not be construed as being limited to the embodiments set forth herein. In the drawings, parts irrelevant to the description of the present invention will be omitted for clarity. Like reference numerals refer to like elements throughout the specification.

Throughout the specification, when a certain part "includes" or "comprises" a certain component, this indicates that other components are not excluded, and may be further included unless otherwise noted. The same reference numerals used throughout the specification refer to the same constituent elements.

An embodiment of the present invention proposes a method of limiting the acceleration of a vehicle when the vehicle travels on an uphill road so as to prevent the vehicle from rolling back and to reduce the influence of acceleration according to the drive force of the vehicle on the body of a passenger based on information on the passenger.

Here, the information on the passenger may include information pertaining to whether the passenger is an infant, and may further include information on the direction that a car seat faces when the passenger is an infant.

FIG. 1 shows an example of the configuration of a torque calculation controller according to an embodiment of the present invention.

Referring to FIG. 1, a vehicle according to an embodiment may include a torque calculation controller 100, which calculates correction torque by applying an acceleration limit to a driver's requested torque in the state in which acceleration limit control is activated, and a drive source controller 200, which controls a drive source (not shown) so that the drive source outputs the correction torque calculated by the torque calculation controller 100.

Here, the drive source may be an internal combustion engine, a motor, or a combination of an internal combustion engine and a motor (for use in, for example, a hybrid electric vehicle). However, this is merely given by way of example, and the embodiments are not limited to any specific type of drive source, so long as the drive source is capable of transmitting drive force to wheels.

In addition, the drive source controller 200 may be an engine management system (EMS), a motor control unit (MCU), or the like depending on the drive source.

In addition, the torque calculation controller 100 may be implemented as a controller that is provided physically separate from the drive source controller 200, or may be implemented as a function of the drive source controller 200. In the case of being implemented as a separate controller, the torque calculation controller 100 may be implemented as an upper-level controller relative to the drive source controller 200, like a hybrid control unit (HCU) or a vehicle control unit (VCU) of an electric vehicle. However, the embodiments are not limited thereto.

Hereinafter, the configuration of the torque calculation controller 100 will be described.

The torque calculation controller 100 may include an acceleration limit calculator 110, a disturbance torque calculator 120, and an acceleration torque limit calculator 130.

The acceleration limit calculator 110 may calculate an acceleration limit $a_{limit}$, which is a target of the acceleration limit control, based on a slope $\theta$.

The disturbance torque calculator 120 may calculate disturbance torque $\hat{d}(\hat{m})$ based on the slope $\theta$, the vehicle speed v, and the drive torque $T_{wheel}$. Here, the disturbance torque $\hat{d}(\hat{m})$ may be torque caused by a disturbance that affects the acceleration of the vehicle, other than the drive torque $T_{wheel}$ output from the drive source and transmitted to the wheels.

The acceleration torque limit calculator 130 may calculate a torque limit $T_{limiter}$, by which the acceleration of the vehicle is limited within the acceleration limit $a_{limit}$ calculated by the acceleration limit calculator 110, based on the disturbance torque $\hat{d}(\hat{m})$ calculated by the disturbance torque calculator 120.

The torque calculation controller 100 may output the smaller value between the driver's requested torque $T_{demand}$ and the torque limit $T_{limiter}$ calculated by the acceleration torque limit calculator 130 as correction torque. Here, the correction torque may be input to the disturbance torque calculator 120 as the drive torque $T_{wheel}$.

Hereinafter, the components of the torque calculation controller 100 will be described in more detail with reference to FIGS. 2 to 4.

Figure 2:
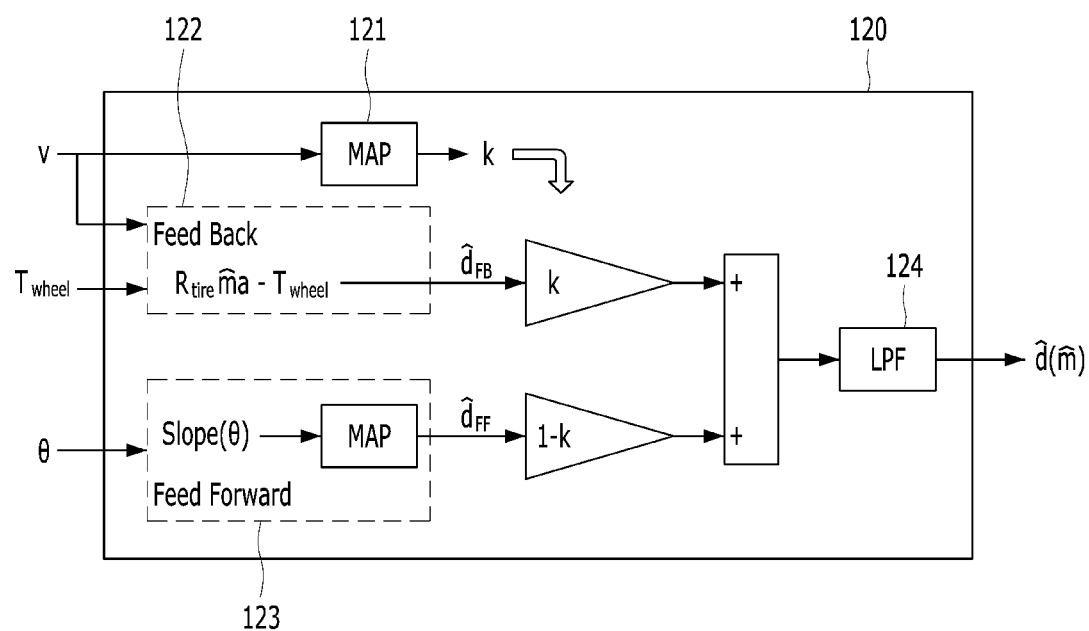
FIG. 2 shows an example of the configuration of a disturbance torque calculator according to an embodiment of the present invention.

FIG. 2 shows an example of the configuration of the disturbance torque calculator according to an embodiment of the present invention.

In order to effectively limit acceleration of the vehicle, it is required to calculate the disturbance torque $\hat{d}(\hat{m})$. The disturbance torque $\hat{d}(\hat{m})$ may be calculated in two methods. The first method is to use rolling resistance and air resistance, which are set in advance according to the vehicle speed v through coasting tests, in a feedforward manner. In some cases, however, this method may be inaccurate because it is not capable of fully applying weather conditions, such as wind, rainfall, or snowfall, a change in the mass of the vehicle, the pneumatic pressure of the tire, and road conditions. The second method is to obtain disturbance in real time in a feedback manner using the output and the acceleration of the vehicle based on the law of force and acceleration ($F_{whl} - d = ma$). Here, the acceleration may be obtained by differentiating the vehicle speed, and an estimated mass $\hat{m}$ may be used as the mass of the vehicle. The estimated mass $\hat{m}$ may be estimated by adding a predetermined weight to the weight of an empty vehicle, or may be estimated based on the law of force and acceleration on a flat road, but the embodiments are not limited thereto. In such a feedback method, when the vehicle speed is 0, the output and the disturbance are measured to be the same value, so an error may be large in a stopped state and in a low-speed state.

In order to solve the problems with the two methods described above, the disturbance torque calculator 120 according to the embodiment determines the proportion of the feedforward method and the proportion of the feedback method according to the vehicle speed, and sums the results obtained through the two methods.

To this end, the disturbance torque calculator 120 may include a first gain calculator 121 having a map defining a first gain value k corresponding to the vehicle speed v, a feedback calculator 122 configured to calculate feedback disturbance $\hat{d}_{FB}$, a feedforward calculator 123 configured to calculate feedforward disturbance $\hat{d}_{FF}$, and a low-pass filter 124.

For example, when the vehicle is stopped, the disturbance torque calculator 120 may set the first gain value k to 0, and may use only the feedforward disturbance $\hat{d}_{FF}$. Thereafter, as the vehicle speed increases, the first gain value k may increase to 1 according to the map of the first gain calculator 121, and the proportion of the feedback disturbance $\hat{d}_{FF}$ may increase. That is, the map of the first gain calculator 121 may have a form in which the first gain value k is 0 when the vehicle is stopped (i.e. when the vehicle speed is 0), increases with an increase in the vehicle speed, and reaches 1 when the vehicle speed reaches a predetermined level or more.

At this time, since the feedforward disturbance $\hat{d}_{FF}$ is mainly used at a low speed, a disturbance value defined in advance in the form of a map with respect to the slope θ through testing in consideration of climbing/descending resistance and rolling resistance, rather than air resistance, may be used. Accordingly, when starting to travel on an uphill road, the acceleration of the vehicle may be effectively limited by appropriately compensating for disturbance.

The low-pass filter 124 may prevent a sudden change in disturbance torque from being transmitted to the acceleration torque limit calculator 130.

Figure 3:
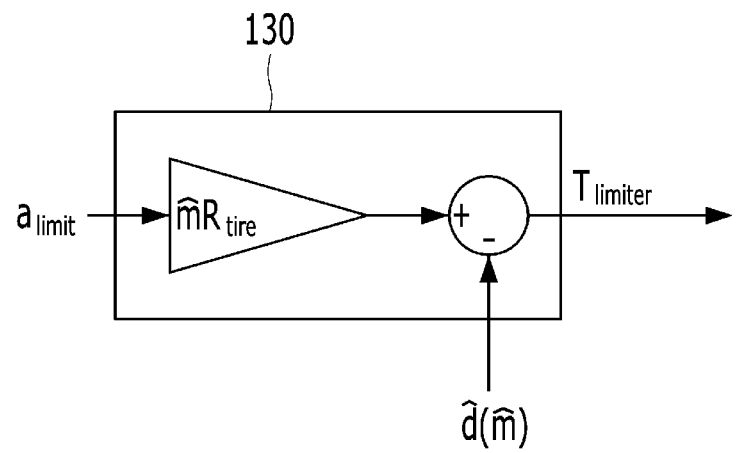
FIG. 3 shows an example of the configuration of an acceleration torque limit calculator according to an embodiment of the present invention.

FIG. 3 shows an example of the configuration of the acceleration torque limit calculator according to an embodiment of the present invention.

Referring to FIG. 3, the acceleration torque limit calculator 130 may calculate acceleration torque by multiplying the product of the estimated mass $\hat{m}$ of the vehicle and the dynamic radius $R_{tire}$ of the tire by the acceleration limit $a_{limit}$. The acceleration torque limit calculator may calculate an acceleration torque limit $T_{limiter}$ by compensating the acceleration torque with the disturbance torque $\hat{d}(\hat{m})$. The reason for compensating the acceleration torque with the disturbance torque $\hat{d}(\hat{m})$ is as follows.

If the estimated mass $\hat{m}$ is accurate and there is no disturbance, the vehicle may be capable of accelerating to the acceleration limit $a_{limit}$ when the acceleration torque is output. However, since a disturbance is present in practice and the estimated mass $\hat{m}$ may be different from the actual mass, it is difficult for the vehicle to accelerate to the set acceleration limit. In order to solve this problem, the acceleration torque is compensated with the disturbance torque $\hat{d}(\hat{m})$. Accordingly, the vehicle is capable of accelerating to the set acceleration limit $a_{limit}$ irrespective of disturbance or an error in the estimated mass m.

Since the acceleration torque limit calculator 130 calculates the acceleration torque limit $T_{limiter}$ by compensating the acceleration torque with the disturbance torque, the torque calculation controller 100 may select the minimum value MIN between the amount of operation of the accelerator pedal by the driver, i.e., the driver's requested torque $T_{demand}$, corresponding to the value of an accelerator pedal position sensor (APS), and the acceleration torque limit $T_{limiter}$ to output final correction torque.

Accordingly, the torque is limited only when the vehicle accelerates above the set acceleration limit $a_{limit}$ according to the driver's requested torque $T_{demand}$, making it possible to effectively limit acceleration while preventing the vehicle from rolling back on an uphill road.

Figure 4:
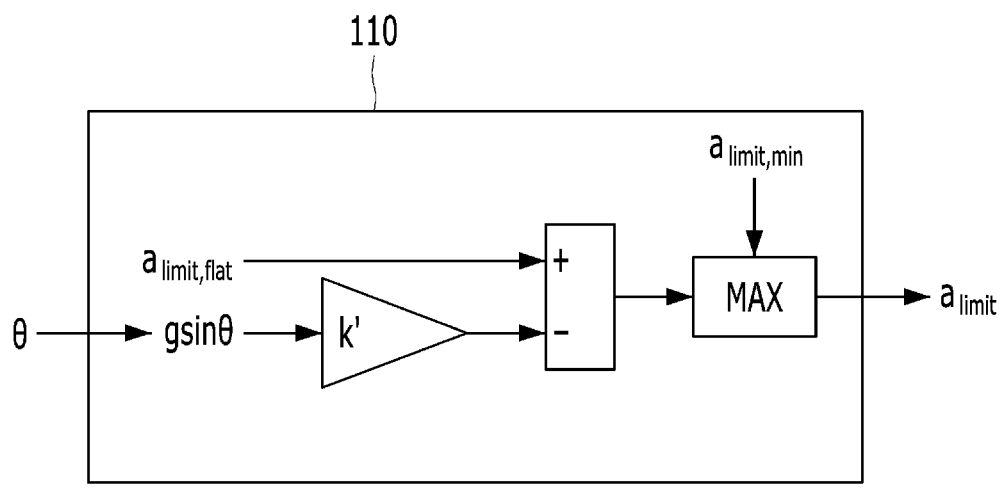
FIG. 4 shows an example of the configuration of an acceleration limit calculator according to an embodiment of the present invention.

FIG. 4 shows an example of the configuration of the acceleration limit calculator according to an embodiment of the present invention.

The acceleration limit calculator 110 according to the embodiment may determine the acceleration limit $a_{limit}$ according to the slope θ in a manner of referring to a table established in advance with respect to the slope θ (for example, through testing). Alternatively, as shown in FIG. 4, the acceleration limit calculator 110 may be implemented so as to simultaneously use a value obtained by compensating the influence of the slope θ with a second gain and an acceleration limit $a_{limit,flat}$ obtained in consideration of the influence of acceleration on an infant on a flat road. An appropriate value of the flat-road-based acceleration limit $a_{limit,flat}$ may be determined through testing. For example, the flat-road-based acceleration limit $a_{limit,flat}$ may range from 1 to 3 m/s², but the embodiments are not limited thereto.

Specifically, when the vehicle travels on an uphill road, an infant seated in a rear-facing car seat is influenced simultaneously by the acceleration of the vehicle and the acceleration of gravity g sin θ, and thus the acceleration limit calculator 110 may calculate the acceleration limit based thereon. For example, the maximum acceleration limit that can be obtained in consideration of the acceleration limit $a_{limit,flat}$, which is set in consideration of the influence of the acceleration on the infant on a flat road, and the slope θ is "$a_{limit,flat}$-g sin θ". At this time, in order to secure the acceleration of the vehicle and perception of the driver with respect to climbing of the vehicle, compensation may be performed by multiplying the influence of the acceleration of gravity by the second gain k'. In this case, k' may have a value ranging from 0 to 1. Alternatively, k' may be determined through testing for each vehicle model (e.g., ranging from 0.2 to 0.8), or may be set by the user through a user setting menu (USM). However, the embodiments are not limited thereto.

The calculated acceleration limit $a_{limit}$ may be finally determined by selecting the saturation value (i.e. MAX) between the "$a_{limit,flat}$-g sin θ" value and the minimum value $a_{limit,min}$ preset to prevent rollback and secure acceleration performance. For example, the preset minimum value $a_{limit,min}$ may range from 0.5 to 2 m/s², but the embodiments are not limited thereto.

The torque calculation process will be described below with reference to FIG. 5 based on the configuration of the torque calculation controller 100 described so far.

Figure 5:
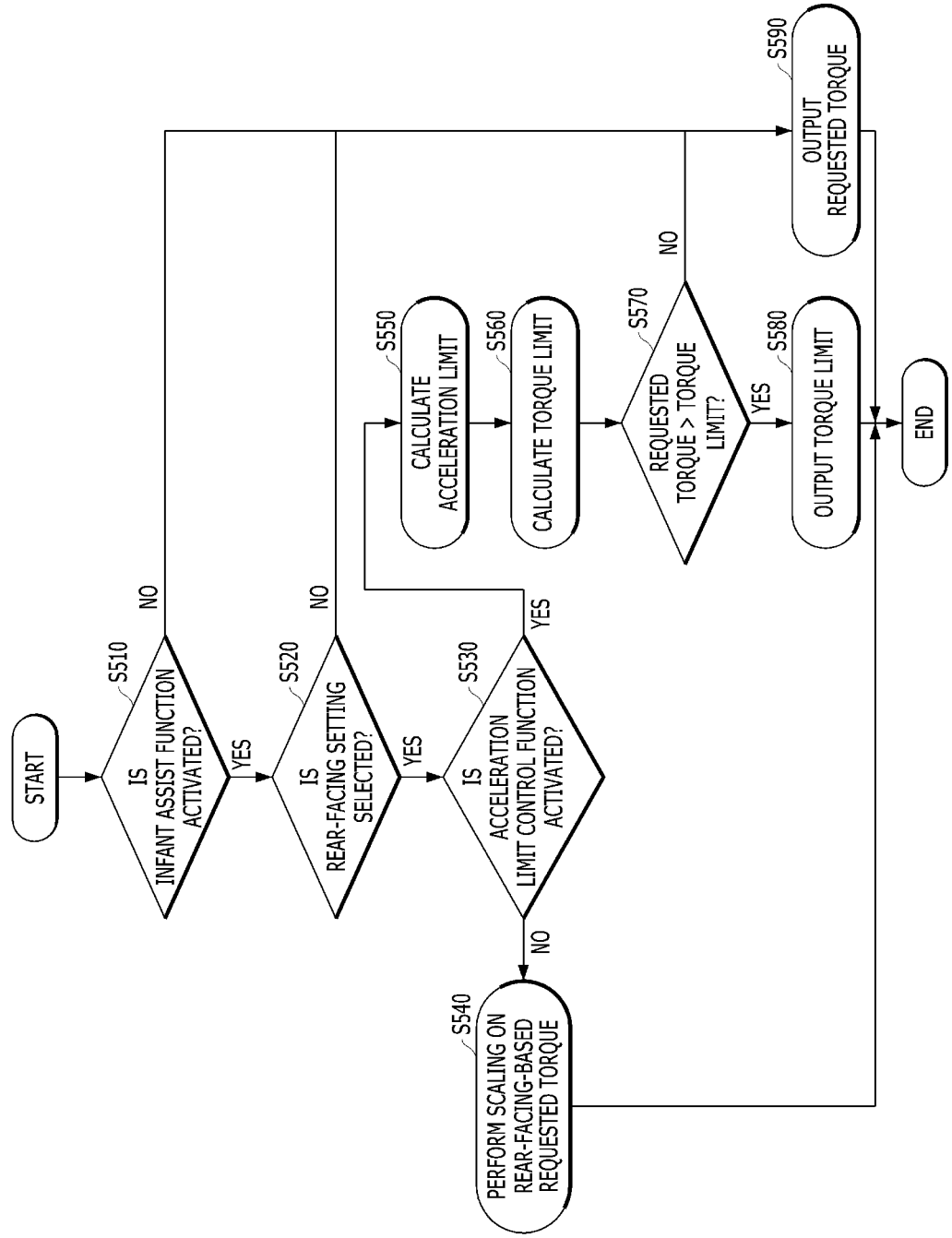
FIG. 5 is a flowchart showing an example of a torque calculation process according to an embodiment of the present invention.

FIG. 5 is a flowchart showing an example of the torque calculation process according to an embodiment of the present invention.

Referring to FIG. 5, when an infant is in the vehicle, an infant assist function, which corrects the output torque of the drive source, is activated (Yes in S510). Subsequently, when the rear-facing setting pertaining to the installation state of a car seat is selected (Yes in S520) and an acceleration limit control function is activated (Yes in S530), the acceleration limit calculator 110 may calculate an acceleration limit $a_{limit}$ (S550).

The acceleration torque limit calculator 130 may calculate an acceleration torque limit $T_{limiter}$ based on the acceleration limit $a_{limit}$ and disturbance torque $\hat{d}(\hat{m})$ calculated by the disturbance torque calculator 120 (S560).

The torque calculation controller 100 outputs the smaller value between the driver's requested torque $T_{demand}$ and an acceleration torque limit $T_{limiter}$. When the driver's requested torque $T_{demand}$ is greater than the acceleration torque limit $T_{limiter}$ (Yes in S570), the acceleration torque limit $T_{limiter}$ may be finally output to the drive source controller 200 (S580). On the other hand, when the driver's requested torque $T_{demand}$ is not greater than the acceleration torque limit $T_{limiter}$, the driver's requested torque $T_{demand}$ may be finally output (S590).

Meanwhile, when the infant assist function is not activated (No in S510), or when the infant assist function is activated (Yes in S510) but when the rear-facing setting is not selected (No in S520), the driver's requested torque $T_{demand}$ may be the output torque of the drive source (S590).

Alternatively, when the infant assist function and the rear-facing setting are applied (Yes in S510 and Yes in S520) but when the acceleration limit control function is not activated (No in S530), scaling may be performed on rear-facing-based requested torque (S540). The specific process of performing the rear-facing-based requested torque scaling will be described later with reference to FIG. 6.

Figure 6:
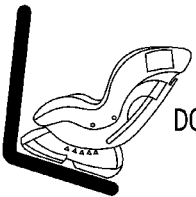
FIG. 6 shows an example of a process of outputting torque according to an embodiment of the present invention.

FIG. 6 shows an example of a process of outputting torque according to an embodiment of the present invention.

Referring to FIG. 6, the rear-facing-based requested torque scaling may be control of lowering an increase in the output torque of the drive source below an increase in the APS value during a predetermined APS section, compared to general control. At this time, in order to protect the infant, scaling may be performed more strongly when the vehicle travels on an uphill road than when traveling on a downhill road.

In addition, in the state in which the acceleration limit control function according to the embodiment is applied, when the vehicle descends a downhill road, the flat-road-based acceleration limit $a_{limit,flat}$ may be applied as it is, but when the vehicle climbs an uphill road, the acceleration limit may be reduced by "g sin θ".

As described above, when the acceleration limit control function, rather than APS scale correction, is implemented to limit acceleration, it is possible to prevent rollback of the vehicle and excessive operation of the APS by the driver, thus effectively protecting an infant.

Meanwhile, in the above-described embodiments, the infant assist function, the orientation of the car seat, and the degree of correction of the acceleration limit may be set and changed through manipulation of predetermined menus by the user. This will be described with reference to FIG. 7.

Figure 7:
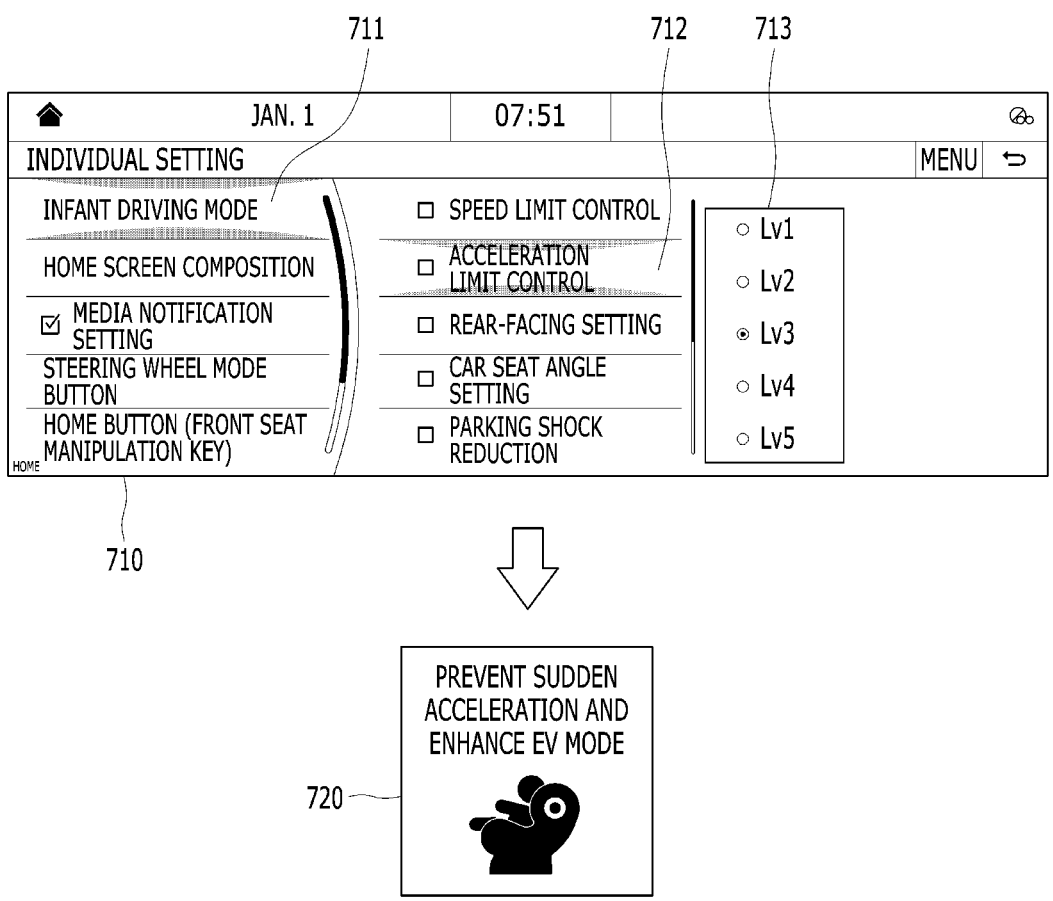
FIG. 7 shows an example of the configuration of a mode setting menu according to an embodiment of the present invention.

FIG. 7 shows an example of the configuration of a mode setting menu according to an embodiment of the present invention.

The upper diagram in FIG. 7 shows the state in which a user setting menu (USM) is called on a display 710 of an audio/video/navigation (AVN) system. When an infant driving mode 711 is selected from among the menu items on the left, the user may select an acceleration limit control function 712 from central sub-menu items. When the acceleration limit control function 712 is selected, the user may select the degree of correction of the acceleration limit 713 from among the sub-menu items on the right. Here, the degree of correction of the acceleration limit 713 may be implemented by changing the minimum value $a_{limit,min}$ of the acceleration limit or the second gain value k' described above, but the embodiments are not limited thereto.

As shown in the lower diagram in FIG. 7, when the infant driving mode 711 is set, information indicating that the corresponding mode is activated may be displayed on an output interface such as a cluster 720.

Hereinafter, various modifications of torque calculation controllers according to other embodiments of the present invention, which are configured differently from the torque calculation controller shown in FIG. 1, will be described with reference to FIGS. 8 to 12. Since the torque calculation controllers shown in FIGS. 8 to 12 differ only in the method of obtaining an acceleration limit, differences from the torque calculation controller shown in FIG. 1 will be mainly described.

Figure 8:
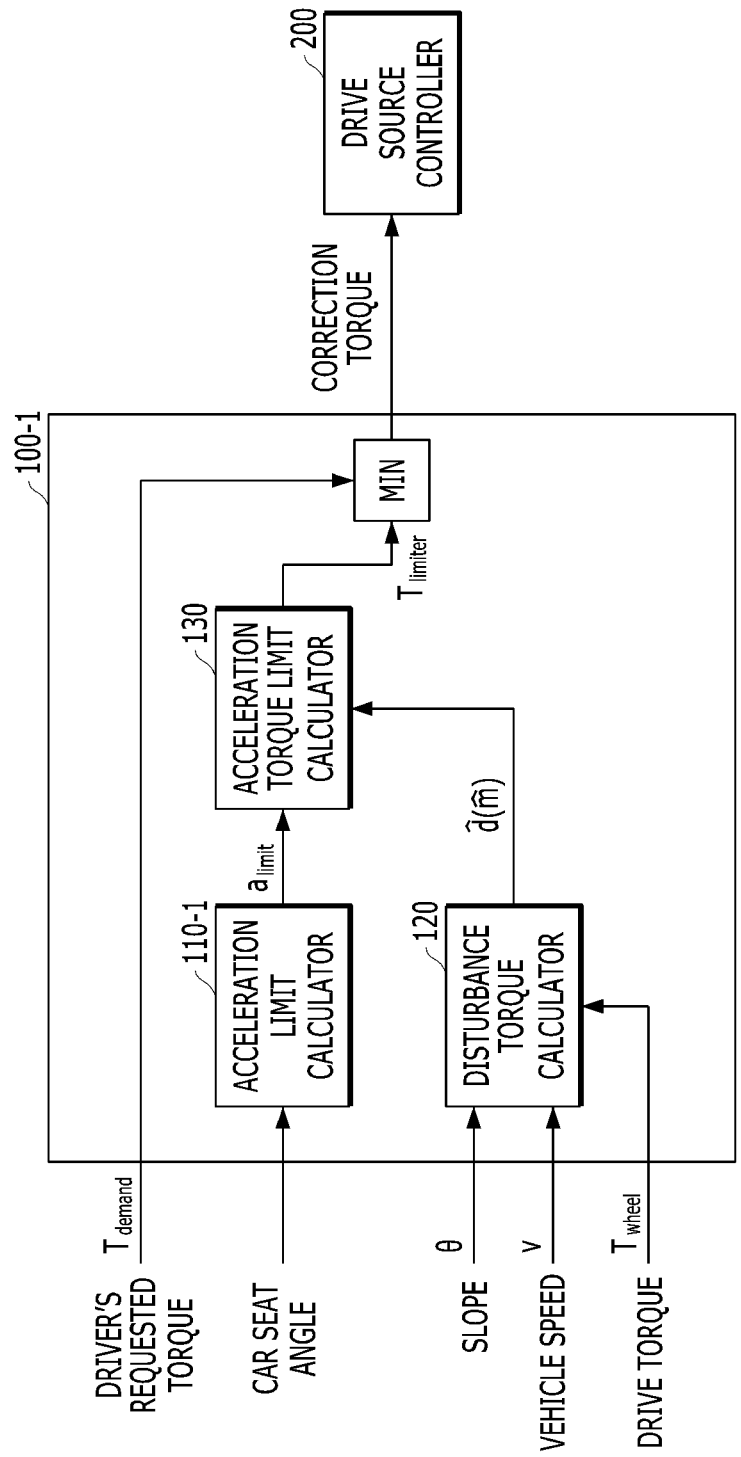
FIG. 8 shows an example of the configuration of a torque calculation controller according to another embodiment of the present invention.

FIG. 8 shows an example of the configuration of a torque calculation controller according to another embodiment of the present invention.

Referring to FIG. 8, an acceleration limit calculator 110-1 of a torque calculation controller 100-1 according to another embodiment may have an angle of a car seat as an input value. Although installed at the same position in the indoor space, as the recline angle of the car seat is smaller, an infant is more influenced by the acceleration of the vehicle. Therefore, the acceleration limit calculator 110-1 may be configured to increase the acceleration limit in proportion to the angle of the car seat.

Figure 9:
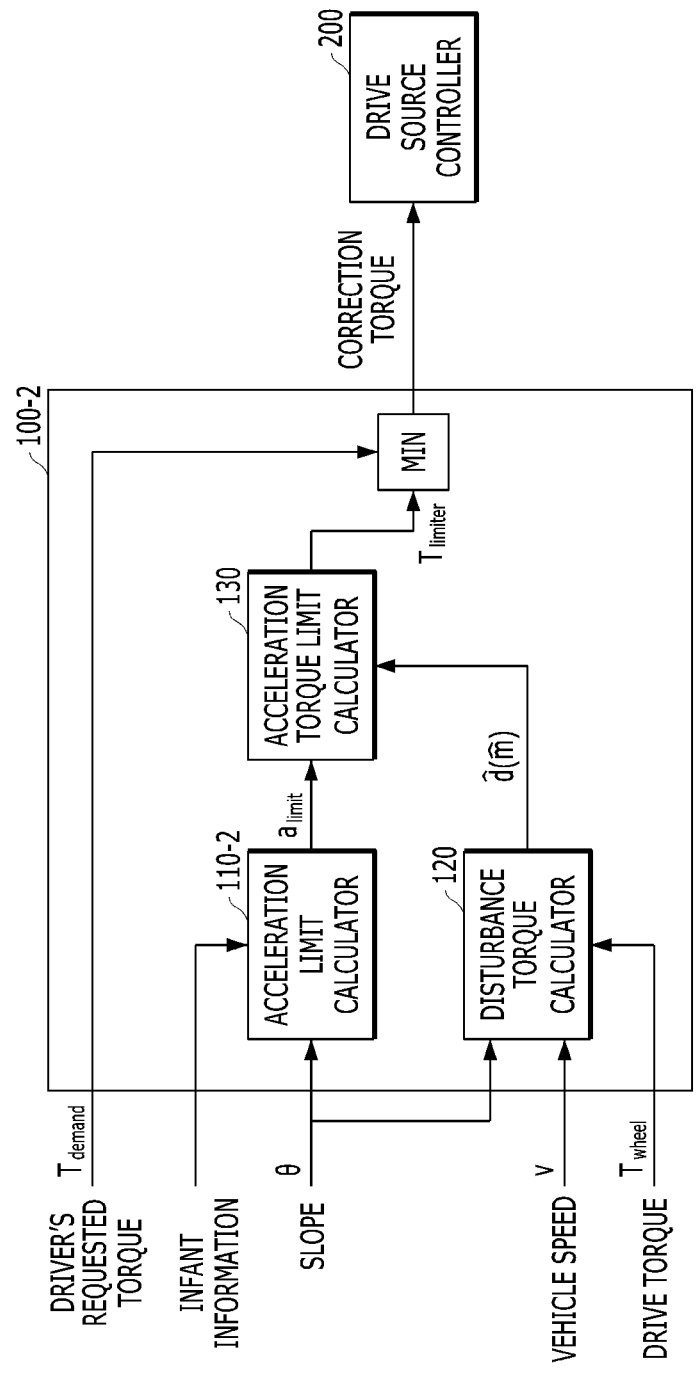
FIG. 9 shows an example of the configuration of a torque calculation controller according to still another embodiment of the present invention.

FIG. 9 shows an example of the configuration of a torque calculation controller according to still another embodiment of the present invention.

Referring to FIG. 9, an acceleration limit calculator 110-2 of a torque calculation controller 100-2 according to still another embodiment may have infant information as an input value. Here, the infant information may include at least one of the infant's age in months, weight, or height.

In the case of a 9-month-old infant, the weight of the head accounts for 25% of the total body weight on average. In the case of a female adult, the weight of the head accounts for only 6% of the total body weight. That is, as the age in months of an infant increases, the proportion of total weight accounted for by the head decreases, and the neck bones become harder. Therefore, it can be seen that the lower the age in months of an infant, the greater the influence of acceleration on the infant. Thus, the acceleration limit calculator 110-2 may receive information on the infant's age in months, weight, and height, and may further enhance correction of the acceleration when the values included in the received information are smaller.

Figure 10:
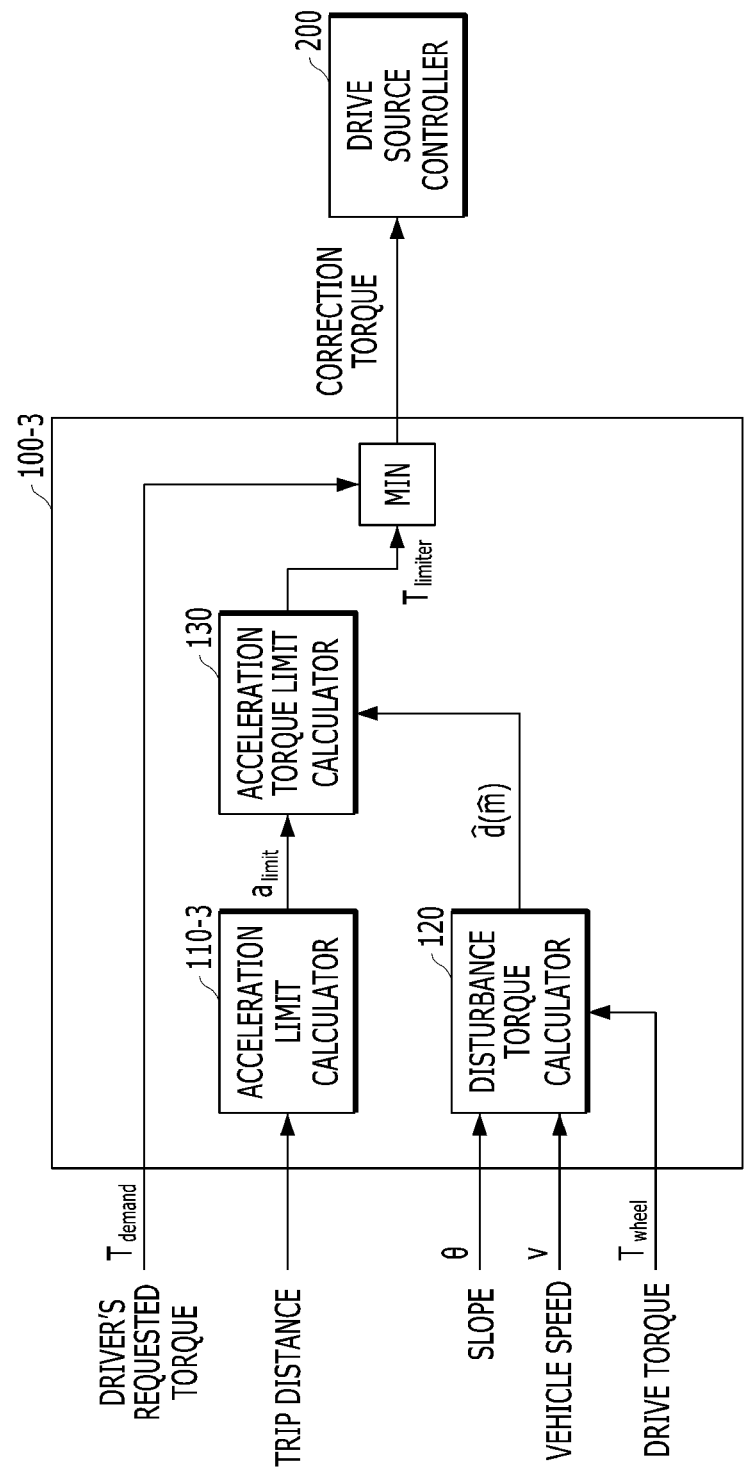
FIG. 10 shows an example of the configuration of a torque calculation controller according to still another embodiment of the present invention.

FIG. 10 shows an example of the configuration of a torque calculation controller according to still another embodiment of the present invention.

Referring to FIG. 10, an acceleration limit calculator 110-3 of a torque calculation controller 100-3 according to still another embodiment may have information on the total trip distance provided from an odometer as an input value.

After a vehicle is manufactured, a certain period of driving is required so that components of the vehicle are settled properly and engaged portions thereof operate smoothly. Therefore, the initial driving greatly influences the lifespan and the performance of a new vehicle, and it is essential to break in a new vehicle. According to the manual, it is recommended to avoid sudden acceleration and deceleration before having traveled a total distance of 1000 km and to drive a new vehicle at a number of revolutions per minute of an engine ranging from 2000 to 4000 rpm in order to break in the new vehicle. In addition to not driving the vehicle engine at a high rpm, it is recommended to smoothly increase and decrease the rpm of the engine and to drive the vehicle engine over the entire rpm range, rather than at a fixed rpm. A method of setting an acceleration limit according to the total trip distance may be used for a break-in mode. For example, the acceleration limit calculator 110-3 may further enhance correction of the acceleration when the total trip distance is shorter.

Figure 11:
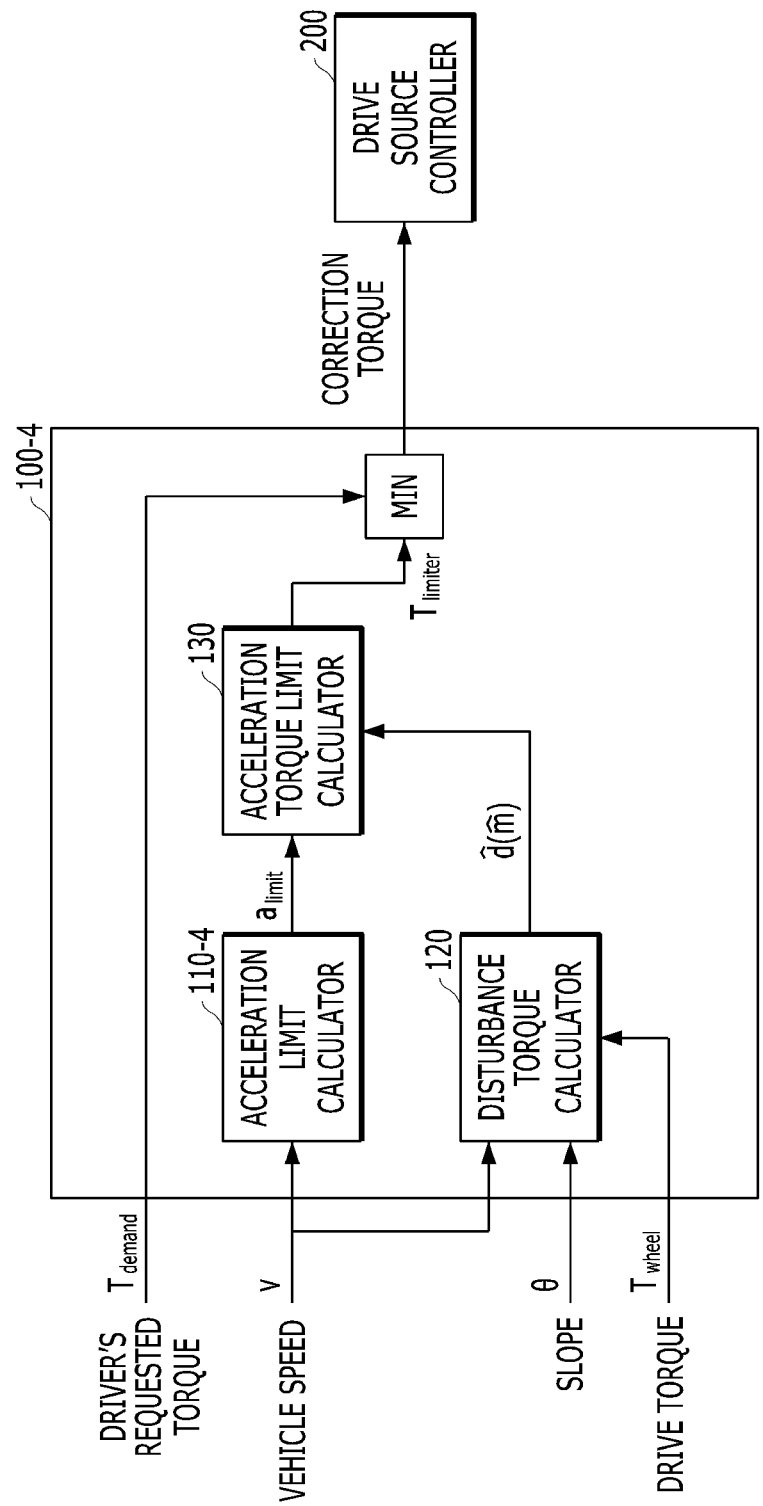
FIG. 11 shows an example of the configuration of a torque calculation controller according to still another embodiment of the present invention.

FIG. 11 shows an example of the configuration of a torque calculation controller according to still another embodiment of the present invention.

Referring to FIG. 11, an acceleration limit calculator 110-4 of a torque calculation controller 100-4 according to still another embodiment may have a vehicle speed v as an input value.

In the case in which the driver is a beginner or drives a new vehicle, the driver may feel a greater than expected sense of acceleration due to improper operation until the driver gets used to the accelerator pedal. In order to prevent this, the acceleration may be limited according to the speed of the vehicle based on a value manually set by the driver or a value preset by the vehicle manufacturer. For example, the acceleration limit calculator 110-4 may further enhance correction of the acceleration when the speed of the vehicle is lower.

Figure 12:
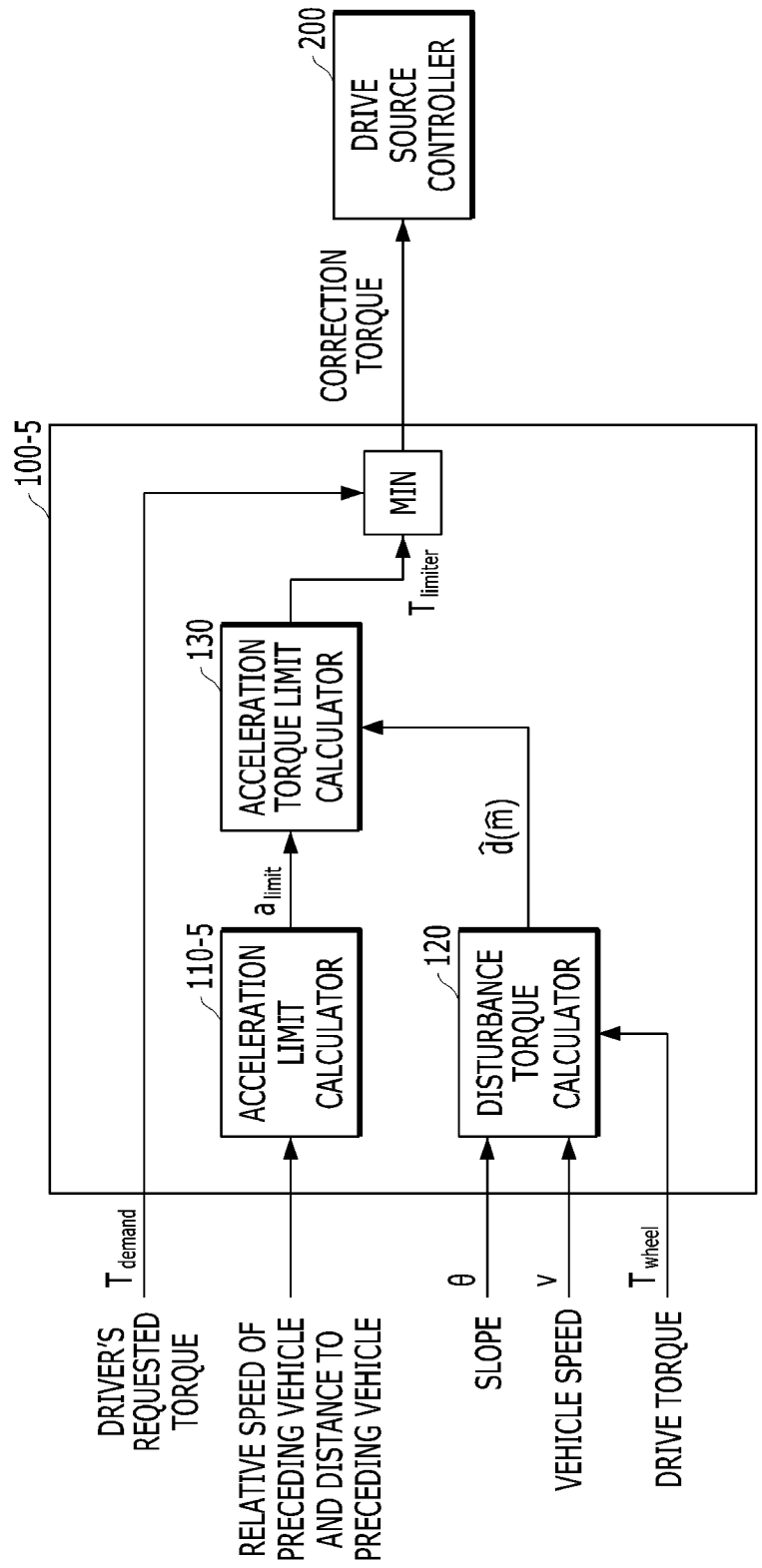
FIG. 12 shows an example of the configuration of a torque calculation controller according to still another embodiment of the present invention.

FIG. 12 shows an example of the configuration of a torque calculation controller according to still another embodiment of the present invention.

Referring to FIG. 12, an acceleration limit calculator 110-5 of a torque calculation controller 100-5 according to still another embodiment may have a relative speed of a preceding vehicle and a distance to the preceding vehicle, included in information provided from an advanced driver assistance system (ADAS), e.g. a smart cruise control sensor, as input values.

For example, after the preceding vehicle starts as a traffic light turns from red to green, when the distance to the preceding vehicle is long, the acceleration limit calculator 110-5 may reduce correction of the acceleration limit in order to maintain a smooth traffic situation. On the other hand, when the distance to the preceding vehicle is short, the acceleration limit calculator 110-5 may enhance correction of the acceleration limit.

As another example, a fixed acceleration limit value may be applied without an acceleration limit calculator. For example, in the case of a rental car, which is shared by many unspecified persons, many users have little or no sense of ownership over a rental car, and thus drive the vehicle roughly, for example, accelerate suddenly, which leads to deterioration in the performance of the vehicle. In this case, it is possible to increase the lifespan of the vehicle by setting an acceleration limit. The acceleration limit may be directly set by a shared car service provider, or may be set based on a value recommended by a vehicle manufacturer.

Meanwhile, the acceleration limit control process according to the embodiments described so far may be temporarily inactivated depending on a situation. For example, an emergency light lighting situation, a turn indicator lighting situation, a blind spot warning output situation, a shock detection situation, or a sports mode operation situation corresponds to an emergency situation, an overtaking situation, or a situation requiring high drive force. In this situation, the acceleration limit control process may be inactivated.

Embodiments of the present invention may be implemented as code that can be written on a computer-readable recording medium and thus read by a computer system. The computer-readable recording medium includes all kinds of recording devices in which data that may be read by a computer system are stored. Examples of the computer-readable recording medium include a Hard Disk Drive (HDD), a Solid-State Disk (SSD), a Silicon Disk Drive (SDD), Read-Only Memory (ROM), Random Access Memory (RAM), Compact Disk ROM (CD-ROM), a magnetic tape, a floppy disc, and an optical data storage.

As is apparent from the above description, the vehicle according to at least one embodiment of the present invention configured as described above is capable of more effectively providing an acceleration limit control function.

Particularly, embodiments of the present invention are capable of controlling acceleration so as to minimize a bad influence of the acceleration on the body of a passenger in consideration of information on the passenger and a slope.

However, the effects achievable through embodiments of the invention are not limited to the above-mentioned effects, and other effects not mentioned herein will be clearly understood by those skilled in the art from the above description.

It will be apparent to those skilled in the art that various changes in form and details may be made without departing from the spirit and essential characteristics of the invention set forth herein. Accordingly, the above detailed description is not intended to be construed to limit the invention in any aspect and is to be considered by way of example. The scope of the invention should be determined by reasonable interpretation of the appended claims and all equivalent modifications made without departing from the invention should be included in the following claims.

What is claimed is:

1. An acceleration limit control method comprising:
   determining an acceleration limit based on information on a passenger;
   determining a disturbance torque due to a disturbance, other than a drive source of a vehicle, based on at least a slope of a road;
   determining a torque limit satisfying the acceleration limit based on the disturbance torque;
   determining an output torque to be generated by the drive source based on the torque limit and a driver's requested torque; and
   controlling the drive source based on the determined output torque to transmit a drive force to wheels of the vehicle;
   wherein determining the disturbance torque comprises:
   obtaining a feedback disturbance torque based on the output torque and a vehicle speed;
   obtaining a feedforward disturbance torque based on the slope; and
   determining the disturbance torque based on the feedback disturbance torque and the feedforward disturbance torque.

2. The acceleration limit control method according to claim 1, wherein determining the acceleration limit comprises determining that an execution condition is satisfied when a rear-facing car seat is installed in the vehicle.

3. The acceleration limit control method according to claim 1, wherein determining the disturbance torque based on the feedback disturbance torque and the feedforward disturbance torque comprises:
   multiplying the feedback disturbance torque by a first gain determined according to the vehicle speed; and multiplying the feedforward disturbance torque by a value obtained by subtracting the first gain from 1.

4. An acceleration limit control method comprising:
determining an acceleration limit based on information on a passenger;
determining a disturbance torque due to a disturbance, other than a drive source of a vehicle, based on at least a slope of a road;
determining a torque limit satisfying the acceleration limit based on the disturbance torque;
determining an output torque to be generated by the drive source based on the torque limit and a driver's requested torque; and
controlling the drive source based on the determined output torque to transmit a drive force to wheels of the vehicle;
wherein determining the disturbance torque comprises:
obtaining a feedback disturbance torque based on the output torque and a vehicle speed;
obtaining a feedforward disturbance torque based on the slope; and
determining the disturbance torque based on the feedback disturbance torque and the feedforward disturbance torque;
wherein determining the disturbance torque based on the feedback disturbance torque and the feedforward disturbance torque comprises:
multiplying the feedback disturbance torque by a first gain determined according to the vehicle speed; and
multiplying the feedforward disturbance torque by a value obtained by subtracting the first gain from 1;
wherein the first gain has a value ranging from 0 to 1;
wherein, when the vehicle is stopped, the first gain is determined to be 0; and
wherein, when the vehicle travels at a predetermined speed or higher, the first gain is determined to be 1.

5. The acceleration limit control method according to claim 1, wherein the slope corresponds to an uphill slope.

6. The acceleration limit control method according to claim 1, wherein determining the acceleration limit is performed based on a value, obtained by subtracting an acceleration according to the slope from a predetermined first acceleration limit, and a second acceleration limit, the second acceleration limit being a predetermined minimum acceleration limit.

7. The acceleration limit control method according to claim 6, wherein a predetermined second gain value is applied to the acceleration according to the slope before the acceleration according to the slope is subtracted from the first acceleration limit.

8. The acceleration limit control method according to claim 6, wherein the first acceleration limit is set based on an influence on a body of an infant on a flat road.

9. A non-transitory computer-readable recoding medium storing a program configured to perform the acceleration limit control method according to claim 1.

10. A vehicle comprising:
vehicle wheels;
a drive source capable of transmitting a drive force to the vehicle wheels;
a torque calculation controller configured to:
determine an acceleration limit based on information on a passenger;
determine a disturbance torque due to a disturbance, other than the drive source, based on at least a slope of a road;
determine a torque limit satisfying the acceleration limit based on the disturbance torque; and
determine an output torque to be generated by the drive source based on the torque limit and a driver's requested torque; and
a drive source controller configured to control the drive source based on the output torque,
wherein the torque calculation controller is configured to obtain a feedback disturbance torque based on the output torque and a vehicle speed, obtain a feedforward disturbance torque based on the slope, and determine the disturbance torque based on the feedback disturbance torque and the feedforward disturbance torque.

11. The vehicle according to claim 10, wherein the torque calculation controller is configured to determine that a condition for executing determination of the acceleration limit is satisfied when a rear-facing car seat is installed in the vehicle.

12. The vehicle according to claim 10, wherein the torque calculation controller is configured to determine the disturbance torque based on a value obtained by multiplying the feedback disturbance torque by a first gain determined according to the vehicle speed and a value obtained by multiplying the feedforward disturbance torque by a value obtained by subtracting the first gain from 1.

13. The vehicle according to claim 12, wherein:
the first gain has a value ranging from 0 to 1;
when the vehicle is stopped, the first gain is determined to be 0; and
when the vehicle travels at a predetermined speed or higher, the first gain is determined to be 1.

14. The vehicle according to claim 10, wherein the slope corresponds to an uphill slope.

15. The vehicle according to claim 10, wherein the torque calculation controller is configured to determines the acceleration limit based on a value, obtained by subtracting an acceleration according to the slope from a predetermined first acceleration limit, and a second acceleration limit, the second acceleration limit being a predetermined minimum acceleration limit.

16. The vehicle according to claim 15, wherein a predetermined second gain value is applied to the acceleration according to the slope before the acceleration according to the slope is subtracted from the first acceleration limit.

17. The vehicle according to claim 15, wherein the first acceleration limit is set based on an influence on a body of an infant on a flat road.

18. The acceleration limit control method according to claim 4, wherein determining the acceleration limit comprises determining that an execution condition is satisfied when a rear-facing car seat is installed in the vehicle.

19. The acceleration limit control method according to claim 4, wherein the slope corresponds to an uphill slope.

20. The acceleration limit control method according to claim 4, wherein determining the acceleration limit is performed based on a value, obtained by subtracting an acceleration according to the slope from a predetermined first acceleration limit, and a second acceleration limit, the second acceleration limit being a predetermined minimum acceleration limit.

* * * * *